US010060407B2

(12) United States Patent
Elefant et al.

(10) Patent No.: US 10,060,407 B2
(45) Date of Patent: Aug. 28, 2018

(54) WAVE ENERGY CONVERTER MAKING USE OF THE ORBITAL MOTION OF A WEIGHING CARRIAGE

(71) Applicants: Felix Elefant, Fontenay-sous-Bois (FR); Alexandre Elefant, Fontenay-sous-Bois (FR)

(72) Inventors: Felix Elefant, Fontenay-sous-Bois (FR); Alexandre Elefant, Fontenay-sous-Bois (FR)

(*) Notice: Subject to any disclaimer, the term of this patent is extended or adjusted under 35 U.S.C. 154(b) by 0 days.

(21) Appl. No.: 15/118,431

(22) PCT Filed: Jan. 23, 2015

(86) PCT No.: PCT/FR2015/000023
§ 371 (c)(1),
(2) Date: Aug. 11, 2016

(87) PCT Pub. No.: WO2015/121551
PCT Pub. Date: Aug. 20, 2015

(65) Prior Publication Data
US 2017/0175702 A1  Jun. 22, 2017

(30) Foreign Application Priority Data
Feb. 12, 2014 (FR) ..................... 14 00383

(51) Int. Cl.
*F03B 13/20* (2006.01)
*F03B 13/22* (2006.01)

(52) U.S. Cl.
CPC .............. *F03B 13/20* (2013.01); *F03B 13/22* (2013.01)

(58) Field of Classification Search
CPC ................. F03B 13/20; F03B 13/22
(Continued)

(56) References Cited

U.S. PATENT DOCUMENTS 1,584,293 A * 5/1926 Hegenbarth ............ F03B 13/20
185/30
3,204,110 A * 8/1965 Masuda .................. F03B 13/20
180/2.2
(Continued)

FOREIGN PATENT DOCUMENTS

FR   2 943 742 A1   10/2010
FR   2 991 397 A1   12/2013
(Continued)

OTHER PUBLICATIONS

International Search Report (PCT/ISA/210) issued in PCT/FR2015/000023, dated May 3, 2016.
(Continued)

*Primary Examiner* — Sean Gugger
(74) *Attorney, Agent, or Firm* — Birch, Stewart, Kolasch & Birch, LLP

(57) ABSTRACT

The invention relates to a module for converting wave energy, consisting of a floating enclosure comprising a hull which communicates its pitching movement to an eccentric mass capable of rotating without backlash about a central axis, and characterized in that: —the pitching is encouraged by the particular profile of the hull and by dynamically adjustable mobile ballast, —the eccentric mass takes the form of an autonomous carriage describing an orbit along a set of circular rails by means of sets of rollers which limit friction and spread load, —an electric generator, mounted on the carriage, meshes with a set of racks of which the pitch, potentially variable, facilitates the electrical conversion, —a generator control system governs the movement of the carriage so as to optimize the extraction of energy.

17 Claims, 6 Drawing Sheets

(58) Field of Classification Search
USPC .................................................. 290/1 C, 53
See application file for complete search history.

(56) References Cited

U.S. PATENT DOCUMENTS

| | | | | | |
|---|---|---|---|---|---|
| 3,231,749 | A | * | 1/1966 | Hinck, III | ............... F03B 13/20 290/53 |
| 3,774,048 | A | * | 11/1973 | Hardingham | ........... F03B 13/20 180/2.2 |
| 4,196,591 | A | * | 4/1980 | Wallace | .............. F03B 13/1895 417/332 |
| 4,266,143 | A | * | 5/1981 | Ng | .......................... F03B 13/20 290/42 |
| 4,993,348 | A | * | 2/1991 | Wald | ....................... B63B 1/107 114/256 |
| 7,223,137 | B1 | * | 5/2007 | Sosnowski | .............. B63B 35/44 290/54 |
| 8,519,557 | B2 | * | 8/2013 | Beane | ..................... F03B 13/20 290/53 |
| 8,907,513 | B2 | * | 12/2014 | Hobdy | .................... F03B 13/20 290/53 |
| 9,394,878 | B2 | * | 7/2016 | Chen | ....................... F03B 13/20 |
| 2011/0265468 | A1 | * | 11/2011 | Paakkinen | ............. F03B 13/20 60/499 |
| 2013/0181454 | A1 | * | 7/2013 | Paakkinen | ............. F03B 13/20 290/53 |

FOREIGN PATENT DOCUMENTS

GB              905446 A        9/1962
WO    WO 2012/007639 A2    1/2012

OTHER PUBLICATIONS

Written Opinion (PCT/ISA/237) issued in PCT/FR2015/000023, dated May 3, 2016.

* cited by examiner

WAVE ENERGY CONVERTER MAKING USE OF THE ORBITAL MOTION OF A WEIGHING CARRIAGE

As of today, various wave energy systems have been designed and developed, without giving rise to practical applications matching the expected performances.

Comparing the different families of existing inventions allows to identify the most beneficial characteristics in view of functional and economical development possibilities, and allows to analyse their respective limitations, in order to invent a new device fulfilling the practical conditions of implementation and operation which are necessary to an efficient conversion of wave power into electricity.

It can thus be observed that the principle of a device entirely contained in a single floating body avoids the problems of undersea foundations, the absence of external components being moreover a guarantee of the system sturdiness and adaptation to the marine environment.

Besides, certain forms of direct electromechanical conversion, without any hydraulic transmission components, allow making use of the motion of a solid, by means of simple implementation and operation.

Among patents using wholly or partly this conversion method, can be mentioned:
  U.S. Pat. No. 3,231,749 (published on Jan. 25, 1966): a floating entity pitches with the waves, and transmits its motion to an eccentric drive, pendularly oscillating in a horizontal plane,
  U.S. Pat. No. 1,584,293 (1925) and U.S. Pat. No. 4,266,143 (published May 5, 1981): one or more eccentrics complete a full rotation, without reversing motion, in a horizontal plane, as a result of the oscillation of the waves.

The limitations encountered by this type of systems in their operation concern mainly:
  the difficulty in making the most of the form of the waves so as to set the device in motion,
  the difficult synchronization of the device with the frequency of the waves, when it comes to maintaining a regular operating regime for the generator,
  the losses due to friction between the different parts,
the sum of these limitations resulting in a reduced overall yield in a production logic.

In this context, the present invention defines a set of original solutions offering, in particular, several degrees of flexibility to optimize the synchronization of the power extraction device with the frequency of the waves, the use of technical components with low friction, the use of customary engineering and manufacturing techniques, as well as to the use of low-value materials, or recycled materials, and minimal and low-tech maintenance.

The wave energy converter, subject-matter of the invention, is essentially made of a floating closed body, designed to entirely contain an electromechanical conversion device powered by the oscillation of the waves.

The hull, or immersed part of the body, is moored, or held in position by a motorized device. It is provided with a set of fins ensuring its constant orientation facing the wave front, and has a particular profile, so as to favor the pitch motion of the module in accordance with the swell.

Note: for ease of description, the part of the hull which is first in contact with an incident wave will be here referred to as the front part of the module, or its prow, and the opposite part will be referred to as the rear-end of the module.

Inside the body, an eccentric mass comes in the form of a weighing carriage able to move along a set of circular rails. This kind of arrangement allows to dispense with a central carrying shaft; it thus avoids friction which would result from the significant bending moment of the eccentric weight on the central pivot.

The pitch motion of the body causes the plane of the rails to tilt, and thus the carriage to move under the effect of its weight. In order to overcome the electromechanical problems specific to the presence of breakpoints or reversing points on the trajectory, such as they occur in a pendular motion, the invention takes advantage of a complete and uninterrupted orbit of the carriage around the central axis (3).

The kinetic energy gained by the eccentric mass during its motion depends on the gravitational potential energy that the wave yields to it by causing the tilting of the plane of its trajectory.

Due to the low amplitude of the orbit inclination, friction is a major limitation, that can even become insurmountable below a certain wave height. In this respect, the invention provides a set of arrangements with the aim of reducing friction losses as the carriage moves along.

The accumulated kinetic energy is converted by an electrical generator integral with the carriage. The generator shaft is driven in rotation by one or two cogwheels meshing with a set of gear racks which are coaxial with the rails. Sliding contacts connect the generator to an electrical rectifier. In this way, the electrical connection of the module to an on-land distribution station avoids line losses that would result from alternative current transmission through marine environment.

A mobile ballast, also set in motion by the swell, amplifies the tilting of the module in the direction of the incoming waves, and so increases the height of fall of the carriage.

The power extraction cycle, resulting from this tilted position, schematically breaks down into four phases:
  during the phase of increasing inclination, under the effect of the incident wave, the trajectory of the carriage is located near the prow, where the carriage gains gravitational potential energy,
  when the maximal inclination of the module is reached, the carriage accelerates downwards, while its gravitational potential energy is converted into kinetic energy; this phase is brief, because the maximal inclination is transient,
  during the phase of decreasing inclination, after the module has tipped over the crest of the wave, the trajectory of the carriage is located near the rear-end of the module, where it gains gravitational potential energy again,
  when the inclination is maximal, the rear part of the module being lifted up by the wave, the carriage accelerates and converts its potential energy again.

The efficient wave energy extraction thus requires the carriage speed to be variable: its covered distance is rather long during a rather brief phase, and rather short during a rather long phase.

In order to allow the generator shaft to be driven at constant speed, despite the speed variation of the carriage in the course of one same cycle, the device may benefit from a set of variable-pitch gear racks, serving as a mechanical adapter, which produces a continuous variation of the reduction ratio. In this way, such a device enables the generator to operate in conditions closer to its nominal rating.

Besides, a servo-control device ensures a continuous synchronization of the revolution period of the carriage with the frequency of the waves according to its variation over time.

Specific characteristics of the invention are given in the description below, featuring an embodiment, which is purely illustrative, and in no way restrictive, in reference to the annexed drawings.

According to the invention, a wave power energy conversion module includes a watertight body consisting of a hull (1) closed by a lid (2), and containing a set of electromechanical parts, in such way that no sensitive component is directly confronted with the marine environment.

Figure 1:
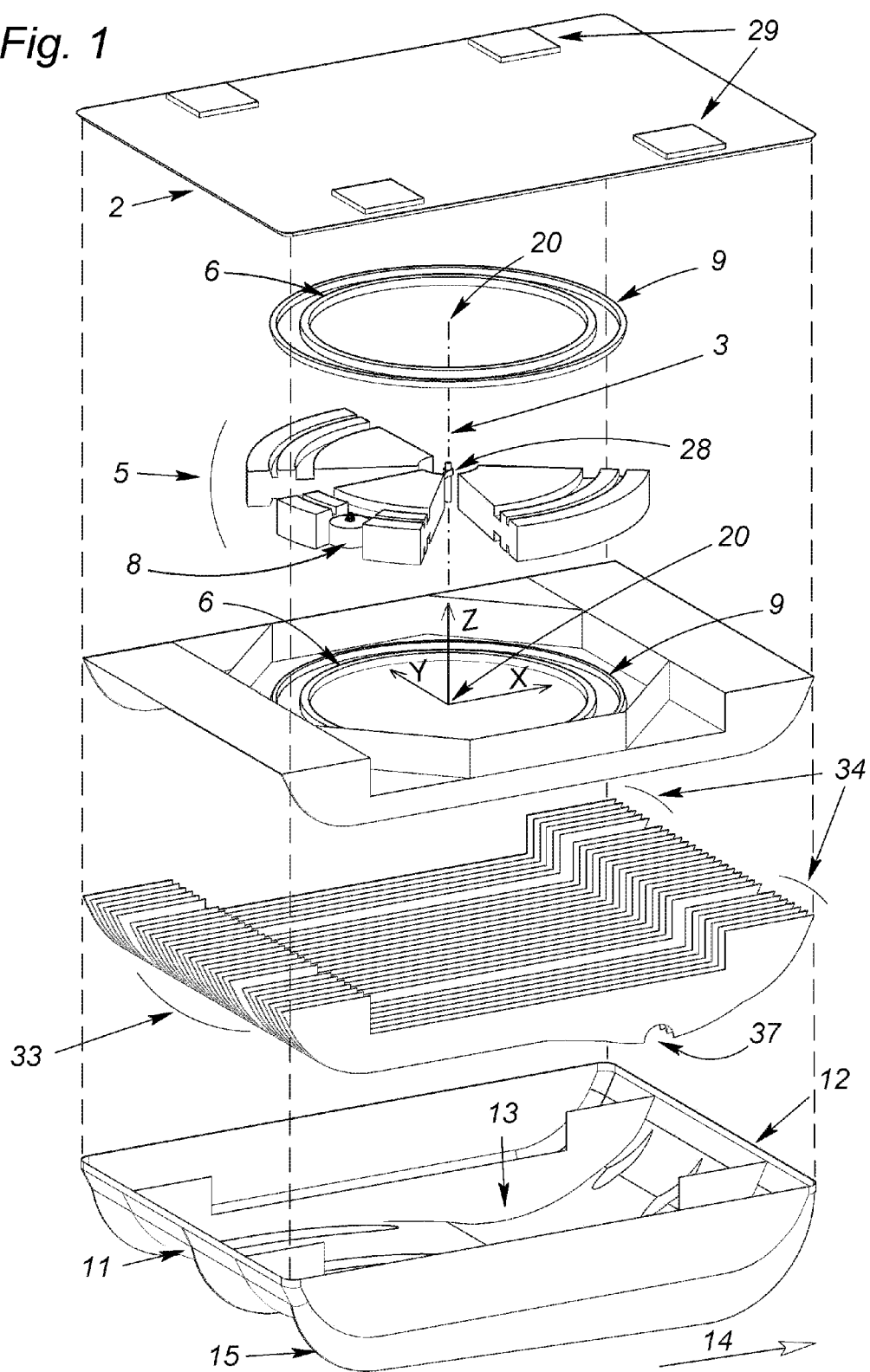
FIG. 1 represents the exploded view of a wave power conversion module.

The body (1) and (2), as illustrated on FIG. 1, presents itself as a low round-edged rectangular raft, floating on the surface of the sea. The hydrodynamic profile of the body, and particularly the underneath of the hull (1), is designed so to enhance the pitch motion due to the waves.

A three-dimensional coordinate system, fixed relatively to the module, is identified by three axis (X, Y, Z), wherein the average direction of X, during the pitch motion, coincides with the wave propagation direction, the average direction of the Z-axis coincides with the vertical, and the Y-axis being perpendicular to the two previous ones. The pitch motion, due to the action of the waves, corresponds to a periodic pivoting around the Y-axis.

Figure 3:
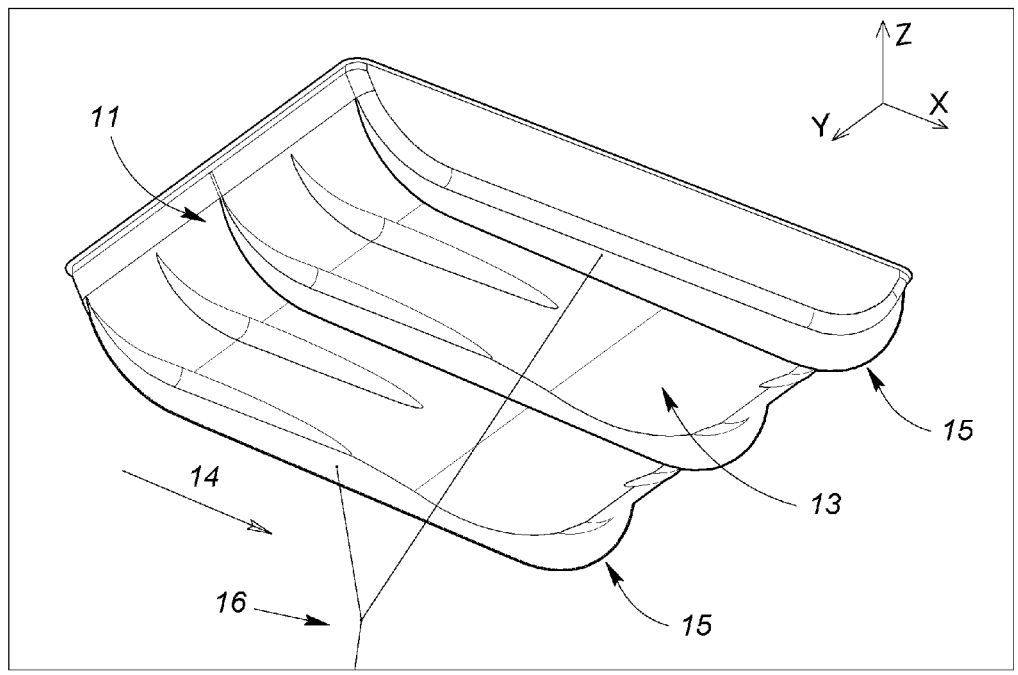
FIG. 3 represents an axonometric view of the hull, seen from below.

When it comes across the hull (1), an incident wave lifts up the prow (11), while the rear-end sinks. The prow takes advantage of a raised profile, spatula-shaped, enabling it to rise onto the top of the wave instead of piercing it. The underside of the hull (1), as illustrated on FIG. 3, features a bulge (13) favorably situated towards the rear-end and which produces a depression, as the wave passes by, thanks to the Venturi effect. This depression contributes to suck the rear-end of the hull (1) towards the bottom and so to increase the inclination of the module on the wave.

On the top of the wave, the hull (1) tips over and the prow (11) dives into the trough of the next wave, while depression on the bulge (13) fades with the water discharging at the rear-end, so that the buoyancy force brings the latter back to the surface. A kind of resonance appears. To a deeper rear-end (12) sinking, responds a stronger upthrust, by reaction of the fluid body.

According to the invention, such a hull (1) geometry presents a preferential direction in relation with the direction of incoming waves (14). This is the reason why the invention intends to use a set of fins (15) fastened to the underneath of the hull (1), and which ensure a consistent orientation of the module with the wave front. Far from being detrimental to the general pitch motion, the fins (15) are capable of channelling the flow underneath the hull (1) so as to strengthen the Venturi effect.

In addition, the invention comprises a mooring system (16), or any other mean for maintaining the geographical position of the module. The one or more anchoring points of the mooring system on the hull (1) are located so as to follow on the pitch motion, and not to oppose it. Furthermore, if using at least two mooring lines, the system (16) allows helping the correct orientation of the hull (1). Alternatively, and supposing for example that the sea is too deep, an active positioning system using a satellite-guided small motorization is also conceivable.

The lid of the body (2) is fitted out as a host platform for maintenance operations, and in this respect provides safety devices such as a fall arrest system, as well as removable panels including hatches (29).

The hull (1) dimensions are proportionate to the average size of the incoming waves, and to the size of the embarked conversion device. As a non-limited example, the length of the hull, considering a swell profile suited for wave power harnessing, is typically comprised between 15 and 30 meters.

According to the invention, the device comprises a crescent-shaped eccentric mass, which circular movement around the Z-axis is continuously sustained by the pitch motion of the hull (1).

This eccentric mass advantageously consists of a carriage (5) running on a set of annular coaxial rails. One rail at least serves as a support whereas one or several optional complementary rails ensure maintaining the carriage (5) on its horizontal trajectory. For indicative and non-limiting purposes, this set of rails is described here in the particular form of two superposed rails (6) having the same diameter.

Contact between the carriage (5) and the rails (6) is ensured by a set rollers (7) mounted on bearings (17). These bearings can in turn be advantageously mounted on economical suspensions (18) of high stiffness and low amplitude, typically washers or spring blades, so as to reduce the effect of eventual irregularities on the rails (6), or of their differential expansion resulting from the combined action of the sun and the water.

Moreover, the invention intends to ensure the rollers (7) of the carriage (5) to roll without slipping on the surface of the rails (6). For this purpose, the rollers (7) in contact with the roll way of the rails (19) present themselves as cone frustums whose apex coincides with the center (20) of their respective roll way (19). In this way, the axis of all the rollers (7) are slightly slanted and converge to a point situated in the center (20) of the roll way (19).

To limit the friction generated by the radial stresses, the carriage (5) is fitted with complementary sets of cylindrical rollers (22) parallel to the Z-axis. These rollers serve as radial support on the lateral sides (23) of the rails (6). For this purpose, these complementary sets (22) are themselves advantageously mounted on bearings (24) and suspensions (25), and the lateral sides (23) of each rail (6) are treated as roll ways.

The invention provides that the radius of the rails (6) is such that the stresses exerted by the carriage (5) on the lateral roll ways (23) are as low as possible. In other words, the carriage (5) is naturally balanced on the rail or rails, and not cantilevered. To achieve this, the center of gravity (26) of the carriage (5) is located vertical to a crescent which is delimited by the chord and the arc defined by the contact points between the rollers and the supporting rail or rails.

The essential quality of the material constituting the mass of the carriage (5) is its density. This demand accords with the use of cheap salvaged materials. For indicative and non-limiting purposes, a composite mass, consisting of very economical material, typically a blending of rubble and recycled objects cast in concrete, and of denser and eventually more expensive material, such as recycled cast steel, taking place on a peripheral crescent centered on the median axis of the carriage (5), represents an economically interesting solution.

Figure 4:
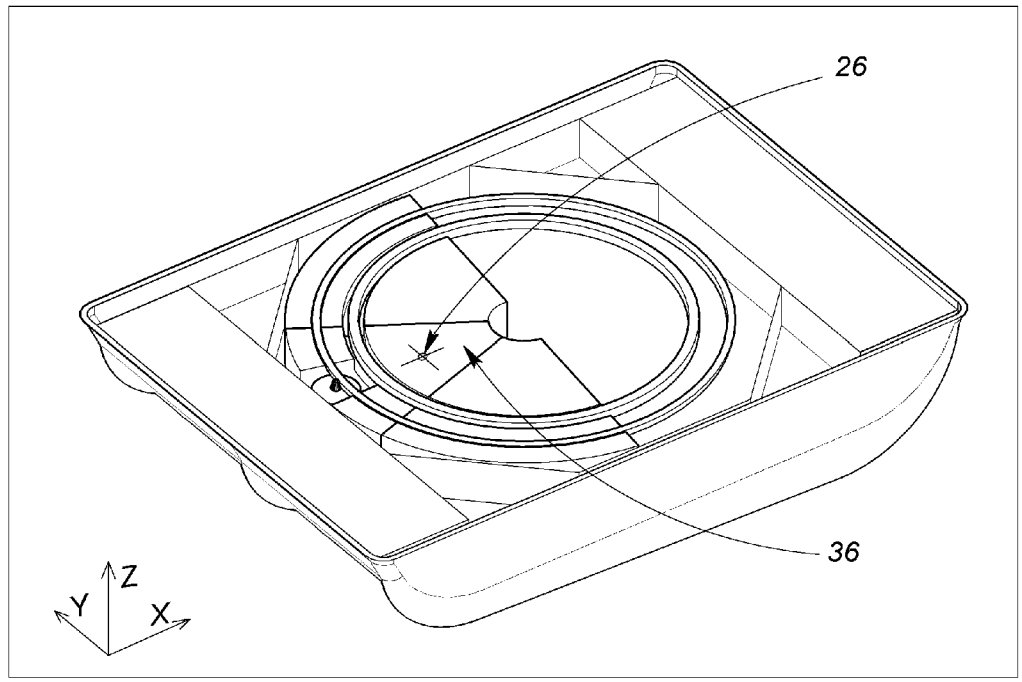
FIG. 4 represents the partially exploded view of the module, in which the angular sectors of the carriage are in maximum-eccentricity position.
Figure 5:
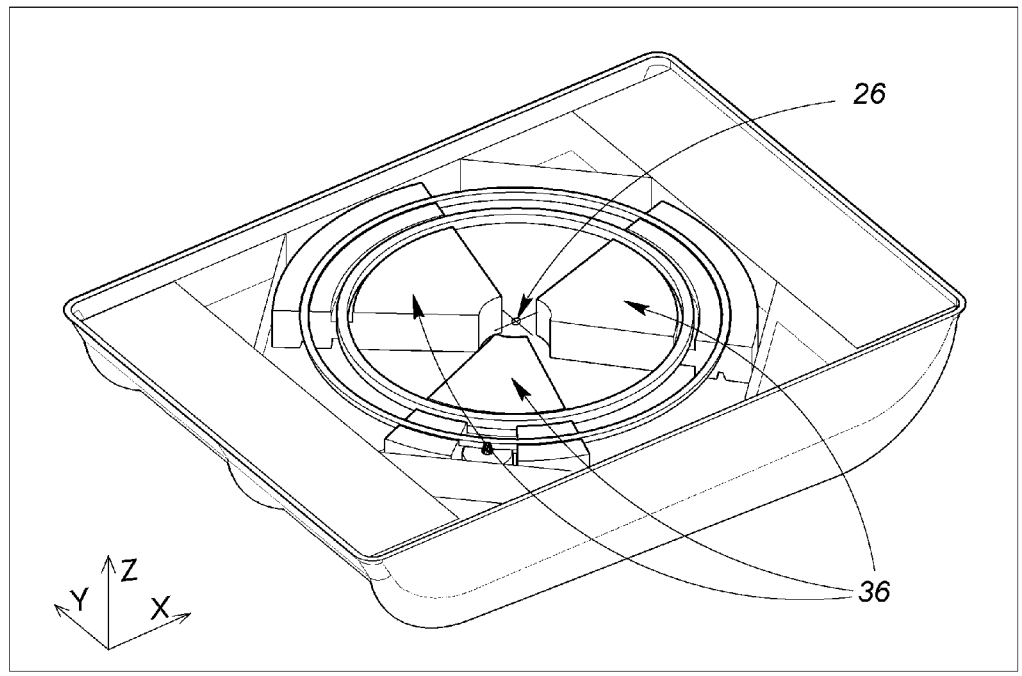
FIG. 5 represents the partially exploded view of the module, in which the angular sectors of the carriage are in minimum-eccentricity position.
Figure 6:
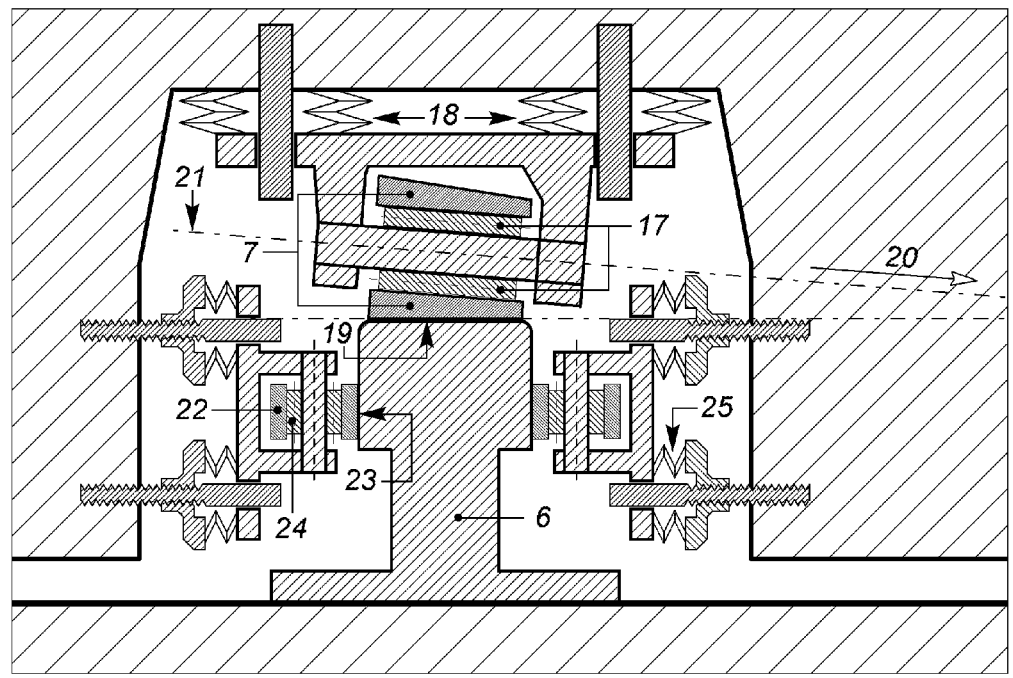
FIG. 6 illustrates in a detailed section view the connection principle between the carriage and the rail on which it is lying.

The carriage (5) as described above can be advantageously split into several angular sectors (36) designed according to a similar principle, and made independent so as to be either brought together as shown on FIG. 4, or distanced from each other along the rails (6) as shown by FIG. 5, this distance inducing a reduction of the mobile mass eccentricity. A balanced distribution of the sectors (36) over the perimeter of the rails (6) has the effect of drawing the center of gravity (26) of the carriage (5) closer to the central axis (3), thus facilitating the device immobilization and its locking at a standstill by means of a brake. The displacement of the sectors (36) relative to one another is ensured by a motorized system, typically consisting of wires operated by capstans or by shafts activated by worm drives, or any other control device to adapt the eccentricity of the carriage (5) to the nature of the waves, a low eccentricity being adequate to initiate rotation, or in case of calm sea.

According to the invention, the conversion device includes an electrical generator (8) fixed to the carriage (5), so to contribute to its mass. The generator (8), whose axis remains parallel or secant to the central axis (3) all along its orbit, is provided with a shaft equipped with a pinion (27) which meshes with a gear rack (9) describing a circle coaxial with the rails (6). The orbital motion of the carriage (5) induces the rapid rotation of the shaft of the generator (8).

The diameter of the pinion (27) is chosen in order to obtain a reduction ratio in accordance with an economical sizing of the generator (8), and particularly with a reduced number of poles.

Advantageously, a second rack-and-pinion system can be implemented symmetrically to the first one, at the opposite end of the generator shaft (8) to better distribute the stresses.

To thwart possible irregularities of the different parts, the invention binds the generator (8) to the carriage (5) by means of a suspension system which holds the pinions (27) in contact with the gear racks (9). Moreover, the stator of the generator (8) can advantageously include one or two idler wheels pressing against one or two lateral roll ways (23) of the rails (6) and serving as a depth guide to avoid radial pressure of the pinions (27) onto the gear racks (9) caused by the suspension of the generator (8). This last measure is beneficial in that it reduces the frictional losses and minimizes the mechanical wear of the rack-and-pinion assemblies.

According to the invention, the electrical connection between the generator (8) and the static part of the module is provided by means of circular sliding contacts (28), typically a set of slip-rings or a catenary system.

Quantitative extraction of wave energy requires the synchronization of the motion of the carriage (5) with the one of the waves. The invention provides a control system for the generator (8) which guarantees, in particular, a speed profile of the carriage (5) including, in the course of its orbit, a deceleration at the approach of each end (11) or (12) of the hull (1), as well as the synchronization of the conversion cycle with the oscillation of the waves. Because of the variable speed imposed by this oscillation, the generator cannot be directly connected to the distribution network.

According to the invention, an advantageous but non exclusive solution is to include an electronic rectifier inside the device. In this way, the power transmission towards any consumption or distribution station can be done by means of submarine cables supplied with direct current.

If need be, an inverter at the end of the line, located on shore for example, allows to produce an AC regulated voltage, and thus typically compatible with a connection to the grid.

According to the invention, the control system implements at least:
- a carriage (5) position sensor;
- a sensor measuring the instantaneous tilting of the module;
- a sensor monitoring the frequency of the incident waves;
- an electronic circuit for controlling the generator (8).

This minimal configuration can be advantageously completed by sensors measuring the electrical variables of the generator (8) in real time, so as to produce a more adapted command law.

In line with the controlling logic previously described, the invention can take advantage of a synchronous generator (8) with separate excitation, allowing a precise control of its torque and, by this means, of the speed profile of the carriage (5). In this precise case, a low-power servo-controlled DC power supply is used for magnetizing the inductor of the rotor.

Figure 7:
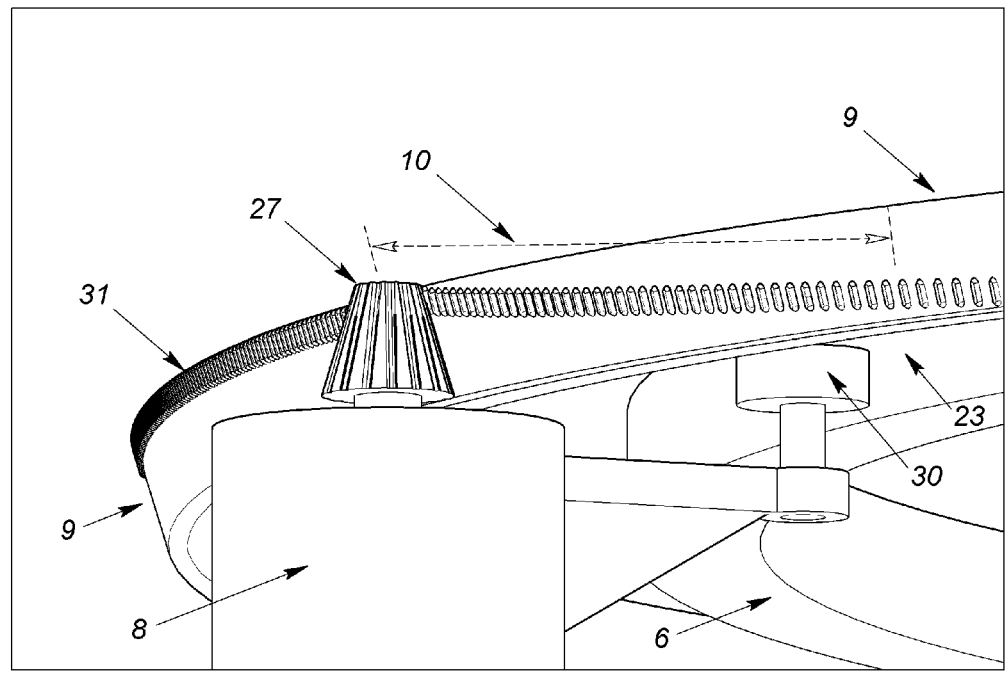
FIG. 7 illustrates in a perspective view the principle of a variable-pitch rack-and-pinion.

The invention also comprises an optional mechanical device allowing to keep a constant spinning speed of the generator (8), despite the changes in the travelling speed of the carriage (5) which drives it: a variable reduction ratio over the orbit is achieved by replacing the gear racks (9) with a particular variable-pitch gear rack system as shown on FIG. 7.

According to the invention, this specific arrangement makes use of elongated frustoconical pinions (27) secured to the shaft of the generator (8). These pinions (27) are equivalent to a continuous set of coaxial pinions of different diameters. Depending on that the toothed track (31) of the gear racks (9) meshes with a part of the pinions (27) rather than another, the multiplications ratio varies. In concrete terms, the gear racks (9) present themselves as cone frustums complementary to the pinions (27) in which however, at a given point of the orbit, the teeth (31) occupy only a small patch of the generatrix of the cone. The spacing between these teeth (31) fits the pitch (10) of the part of the pinion it meshes.

In this manner, the pitch (10) between the teeth (31) and thus the reduction ratio of the rack-and-pinion assemblies is continuously variable and can offer a mechanical adaptation correlated with the reference speed profile of the carriage (5).

Despite the increased complexity compared with fixed pitch gear racks, the attenuation of the mechanical fluctuations perceived by the generator (8) offers the advantage of operating closer to the nominal running conditions, and thus of more economical sizing.

In the logic of intensive production, the invention enables networking of several modules, set up as a farm. The gathering of geographically close modules advantageously enables to pool some peripheral systems, and the maintenance operations.

The modules of one same farm can be arranged as a mesh pattern on the water surface by means of ropes, chains or connecting rods. In this way, the means for keeping the farm in position, either through mooring (16) or any other ways, can be shared.

Figure 8:
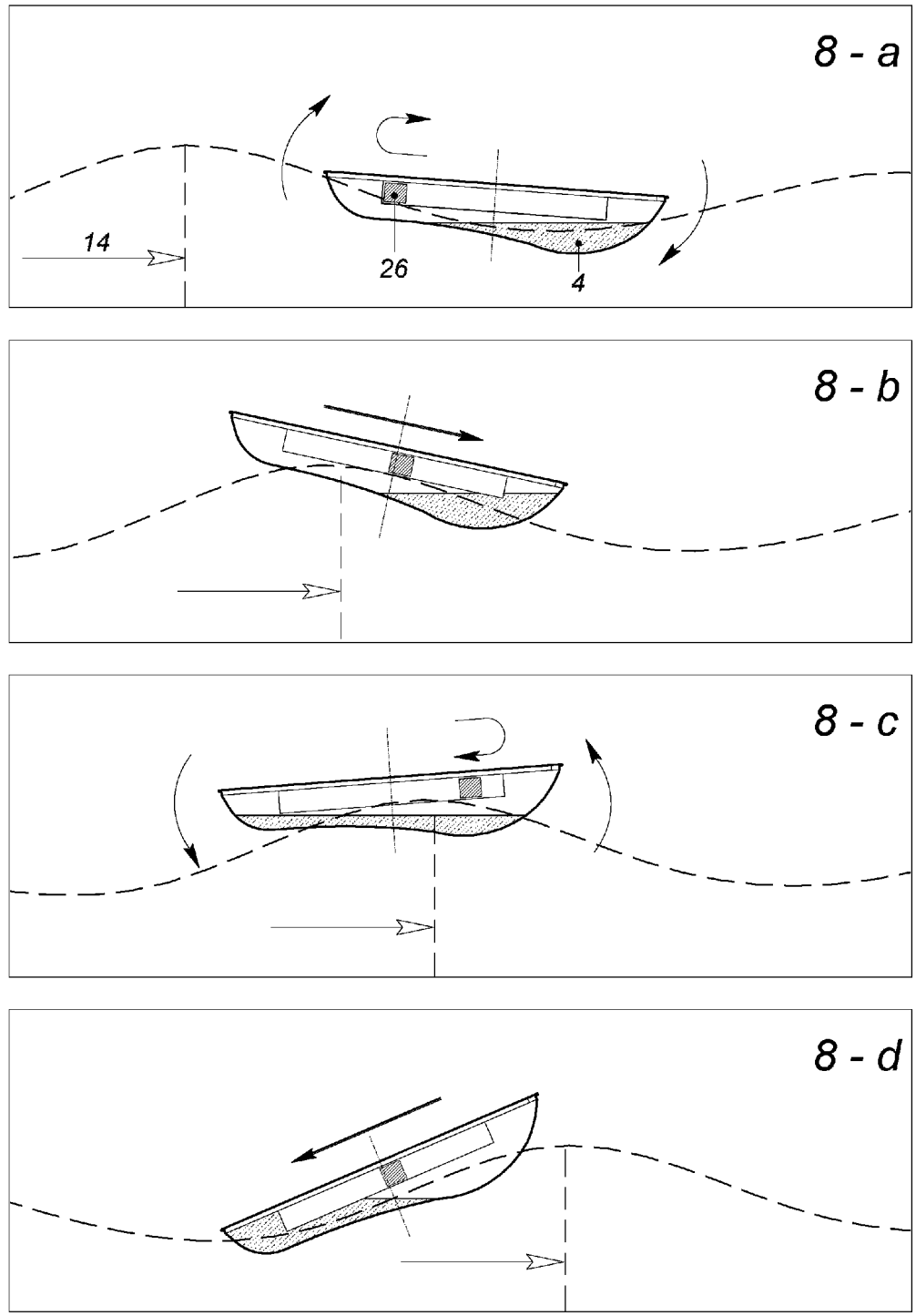
FIG. 8 represents in, a schematic section view, the four main phases of the conversion cycle.
Figure 9:
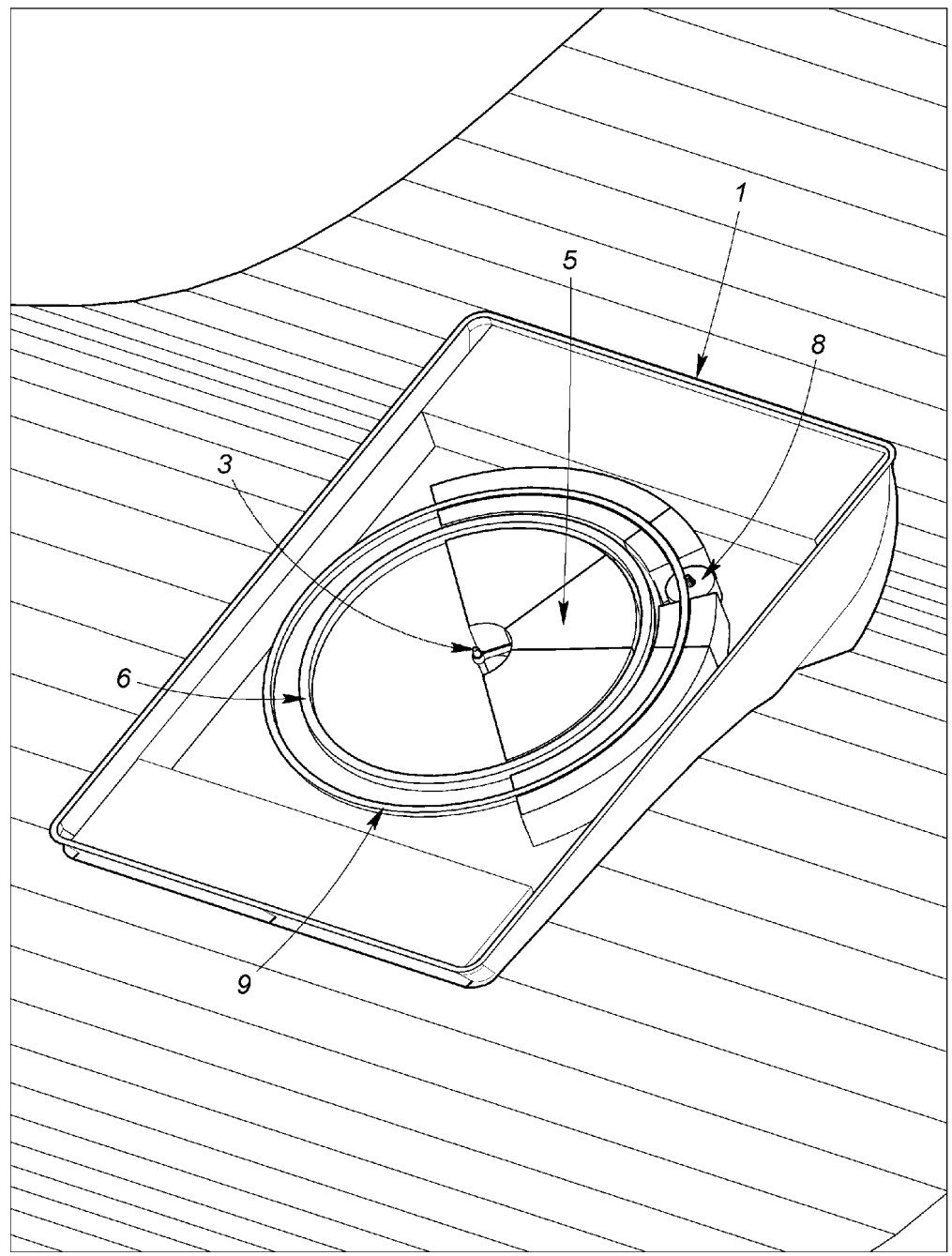
FIG. 9 represents an exploded view of the module placed on water.

Moreover, the means for transmitting and shaping the electrical power can be pooled downstream of the rectifier of each module to benefit of scale economies. Furthermore, the use of a set of variable-pitch gear racks, as previously described (FIG. 7), allows sharing a same rectifier, since the frequency of the waves is common to all connected modules, thus enabling the smoothing of the collective power output. In this case, the synchronization of the cycle phases (FIG. 8-a to 8-d) between the different generators (8) of the farm is indeed not necessary, and the different modules can be arranged on distinct fronts without risk of electrical mismatch.

Moreover, the interconnection of modules upstream of the rectifier allows an episodic driving action of the generator (8), which considerably extends the number of control strategies, particularly during motion setting sequences of the carriage (5) on low amplitude waves.

Furthermore, in steady state, the regularity of the conversion cycles tends to improve by collective effect.

According to the invention, an economical device consisting of an oscillating ballast (4) enables to improve the power extraction substantially.

Given its important mass and its motion controlled to oppose the waves, the carriage (5) noticeably reduces the pitching of the module, which significantly diminishes its efficiency. An oscillating counterweight moving in translation along the direction X under the action of its own weight enables to compensate the effect of the carriage (5) on the pitch motion, and even amplifies it.

According to a preferred, but not limiting, embodiment, illustrated on FIG. 1, the invention makes use of all or parts of the module construction voids, by arranging them as a set of parallel straight ducts (32), of axis X, joining the prow (11) to the rear-end of the hull (12). These ducts (32) are partially filled with water, so as to constitute a mobile ballast (4) the flowing of which oscillates naturally with the waves. This device enables, on the one hand, to amplify the pitch motion and, on the other hand, to extend the duration of maximum inclination phases, FIG. 8-b and FIG. 8-d. The fast flowing of the ballast (4) during the phases of increasing or decreasing inclination, FIG. 8-a and 8-c, results in its temporary stagnation at the lowest end of the module. In this way, the oscillating ballast (4) contributes to stabilize the maximal inclination positions and leaves more time for the carriage (5) to make its descent in optimal inclination conditions.

The generally longitudinal shape of the ducts (32) favors the pitch motion without contributing to the roll motion.

According to a judicious embodiment of the present invention, the ducts (32) containing the ballast (4) are combined with the ribs structuring the hull (1).

The interest of such an arrangement lies in the inexpensive control possibilities it offers. In fact, the air proportion in the ducts (32) determines the hydrodynamic behavior of the ballast (4) they contain.

The invention provides, in this respect, that the ducts (32) can be advantageously divided into several separate compartments. In the particular case illustrated in FIG. 1, a first compartment (33) occupies the median part of the hull (1), whereas a second one (34) occupies two symmetrical corridors on either sides thereof.

Figure 2:
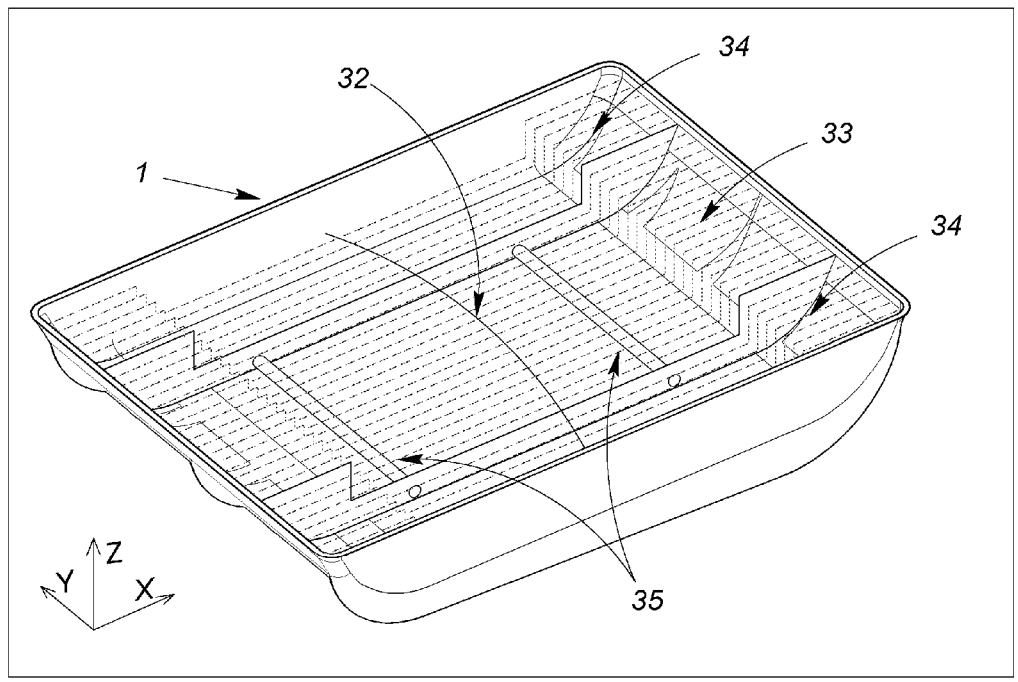
FIG. 2 represents an axonometric view of the hull and the structures containing the mobile ballast.

A homogeneous filling level of the ducts (32) within a same compartment is obtained by means of openings (37) formed between adjacent ducts (32), and a set of pipes (35), represented on FIG. 2, that unite the two parts of the second compartment (34).

According to the invention, a controlled bidirectional pumping system ensures the transfer of the ballast (4) between the compartments, (33) and (34), and thus enables adjusting the pitching propensity of the whole module, to ensure optimal extraction conditions according to the characteristics of the incoming waves. A partially filled compartment sees its center of gravity moving along the X-axis of the module. Conversely, an entirely filled or empty compartment is inert, and thus does not participate to the pitch motion.

The pumping device of the ballast (4) therefore offers a way to keep the module safe in case of a storm or during a maintenance operation, thanks to the full transfer of ballast (4) into one of the compartments (33) or (34).

According to the invention, an optional configuration matching all the aforementioned arrangements, and using within the same module two similar carriages (5), but rotating in opposite directions on two distinct sets of rails (6), enables to reduce the roll motion of the hull (1) significantly. In such a configuration, indeed, the two carriages (5) are controlled so as to achieve a symmetrical motion relative to the X-axis, so that the center of gravity of their overall two masses oscillates only along this same direction X.

As a guideline, but not limited thereto, the two sets of rails are typically superposed and coaxial, or coplanar and symmetrical with respect to the longitudinal axis, X, of the module.

The invention claimed is:

1. A wave energy conversion module for exploiting an orbital motion of an eccentric mass, entirely contained in a floating enclosed body, wherein said wave energy conversion module comprises:
   a hull in the shape of a rectangular raft,
   a lid fitted out as a host platform for maintenance operations,
   a weighing carriage moving along an orbit guided by a set of circular rails, wherein an eccentricity of the center of gravity of said carriage is continuously adjustable by distributing the eccentric mass of said carriage in distinct angular sectors, the relative position of said angular sectors being controlled,
   an electrical generator mounted on the carriage, driven by one or more pinions along a set of gear racks coaxial with the rails.

2. The wave energy conversion module according to claim 1, wherein an underneath of the hull is arranged so as to favor a pitch motion, and comprises:
   a raised prow,
   a bulge near a rear-end,
   a set of parallel fins,
   anchoring points along the pitch axis.

3. The wave energy conversion module according to claim 2, wherein the carriage is maintained on a path without sliding, by means of:
   frustoconical support rollers held by first bearings, said first bearings are mounted on a first suspension system, and
   radially pressing cylindrical rollers held by second bearings, said second bearings are suspension mounted on a second suspension system.

4. The wave energy conversion module according to claim 3, wherein the electrical generator is connected to a rectifier via sliding contacts, in the form of slip-rings or a catenary system.

5. The wave energy conversion module according to claim 4,
wherein the electrical generator comprises a generator shaft; and
wherein the electrical generator is mounted on a third suspension system, and provided with a set of idler wheels serving as a stop to limit the radial pressure of the generator shaft on the set of gear racks.

6. The wave energy conversion module according to claim 1, wherein the movement of the carriage along a trajectory is controlled by a system comprising at least:
a sensor measuring an inclination of the module;
a sensor measuring a position of the carriage at least once per cycle;
a sensor measuring a frequency of incident waves;
an electronic circuit controlling the generator;
a braking device enabling total immobilization of the carriage.

7. The wave energy conversion module according to claim 1, wherein at least one gear rack presents a continuously variable pitch due to a frustoconical pinion form, said pinion meshes on a part of a height with teeth of the at least one gear rack, the spacing between the teeth varying along the orbit of the generator; wherein the spacing of the teeth increases as an apparent diameter of the pinion increases.

8. The wave energy conversion module according to claim 1, wherein said module comprises a module pitch increasing device wherein an oscillating ballast in form of a fluid mass moves due to the fluid mass' weight in a set of longitudinal ducts.

9. The wave energy conversion module according to claim 8, wherein said module comprises a system for dynamic adjustment of the oscillating ballast.

10. The wave energy conversion module according to claim 1, wherein the combination, in a same enclosure of a double set of carriages on rails rotating in opposite directions enables to limit a roll motion of said wave energy conversion module.

11. The wave energy conversion module according to claim 1, wherein said module forms, in combination with a plurality of similar modules, an operating farm arranged as a network enabling to pool means for position keeping, and means for electric current rectification and transmission.

12. A method of producing electricity by extraction of wave energy by means of a conversion module according to claim 1, wherein said method comprises at least the 4 following steps:
1) during a phase of increasing inclination, under the effect of an incident wave, the trajectory of the carriage is located near a prow of the module, where the carriage gains gravitational potential energy,
2) when the maximal inclination of the module is reached, the carriage accelerates downwards, while the carriage's gravitational potential energy is converted into kinetic energy,
3) during the phase of decreasing inclination, after the module has tipped over the crest of the wave, the trajectory of the carriage is located near a rear-end of the module, where the carriage gains gravitational potential energy again, and
4) when the inclination is maximal, the rear-end of the module being lifted up by the wave, the carriage accelerates, converting the carriage's potential energy to kinetic energy again.

13. The method of claim 12, wherein produced electricity is transmitted towards at least one consumption or distribution station.

14. The method of claim 13, wherein the produced electricity is transmitted by means of an inverter at an end of an electrical line, producing AC regulated voltage.

15. The method of claim 14, wherein the produced electricity transmitted is compatible with a connection to a grid.

16. The wave energy conversion module according to claim 9, wherein said system for the dynamic adjustment of the oscillating ballast comprises:
ducts grouped in several distinct longitudinal compartments, enabling a symmetrical filling relative to a median axis of the hull;
a set of punctual openings and pipes ensuring a homogenous filling level within a same compartment; and
a servo pump enabling the transfer of the ballast from one compartment to another compartment.

17. A wave energy conversion module for exploiting an orbital motion of an eccentric mass, entirely contained in a floating enclosed body, wherein said wave energy conversion module comprises:
a hull in the shape of a rectangular raft,
a lid fitted out as a host platform for maintenance operations,
a weighing carriage moving along an orbit guided by a set of circular rails,
an electrical generator mounted on the carriage, driven by one or more pinions along a set of gear racks coaxial with the rails,
wherein at least one of said gear racks presents a continuously variable pitch due to a frustoconical pinion form, said pinion meshing on a part of a height with the teeth of the at least one of said gear racks, the spacing between the teeth varying along the orbit of the generator; and
wherein the spacing of the teeth increases as an apparent diameter of the pinion increases.

\* \* \* \* \*